United States Patent [19]

Hayes et al.

[11] Patent Number: 4,855,842
[45] Date of Patent: Aug. 8, 1989

[54] DEDICATED PROGRAMMABLE CONTROLLER FOR INTERACTIVE VIDEO DISC SYSTEM

[75] Inventors: John B. Hayes; Douglas L. Armstrong, both of Atlanta, Ga.

[73] Assignee: Professional Training Systems, Inc., Atlanta, Ga.

[21] Appl. No.: 82,770

[22] Filed: Aug. 6, 1987

[51] Int. Cl.[4] .............................................. H04N 5/76
[52] U.S. Cl. .................................. 358/342; 358/903; 364/900; 369/32
[58] Field of Search ....................... 369/24, 30, 32-33; 358/335, 342, 903; 364/200, 900; 340/825.15, 825.52, 825.83

[56] References Cited

U.S. PATENT DOCUMENTS

| | | | |
|---|---|---|---|
| 4,142,232 | 2/1979 | Harvey | 369/32 X |
| 4,449,198 | 5/1984 | Kroon et al. | 364/900 |
| 4,464,733 | 8/1984 | Misker et al. | 364/900 |
| 4,527,262 | 7/1985 | Manto | 369/33 |
| 4,609,358 | 9/1986 | Sangster | 358/342 X |
| 4,626,847 | 12/1986 | Zato | 340/825.52 X |
| 4,630,231 | 12/1986 | Hirata et al. | 369/32 X |
| 4,641,295 | 2/1987 | Furukawa et al. | 369/32 |
| 4,685,001 | 8/1987 | Martin | 369/30 X |
| 4,703,450 | 10/1987 | Sueyoshi et al. | 364/900 |
| 4,717,971 | 1/1988 | Sawyer | 358/903 X |

OTHER PUBLICATIONS

Zilog Data Book, 1985. Front Cover, Inside Cover Sheet, pp. 63-84 (Z8681) and 839-860 (Z8530).

Primary Examiner—Alan Faber
Assistant Examiner—W. R. Young
Attorney, Agent, or Firm—Jones, Askew & Lunsford

[57] ABSTRACT

A dedicated video disc player controller for use in interactive video disc playback systems. The controller includes memory for storing instructions representing particular commands to a video disc player in response to the present segment of the video disc being displayed and a plurality of external inputs provided through a keyboard. Multiple ports for communicating with a variety of non-standard control posts on various video disc players are all provided through a single 25 pin connector. The ports include three serial RS-232 level ports one TTL level serial port, one TTL level 8 bit parallel port, and several TTL input lines for reading control port responses from the video disc player. Plug insertable memory cards are used to provide instructions for playback sequence and response to keystrokes as well as for selectively downloading data indicative of the responses of past users, and modifying the operating firmware of the controller.

5 Claims, 7 Drawing Sheets

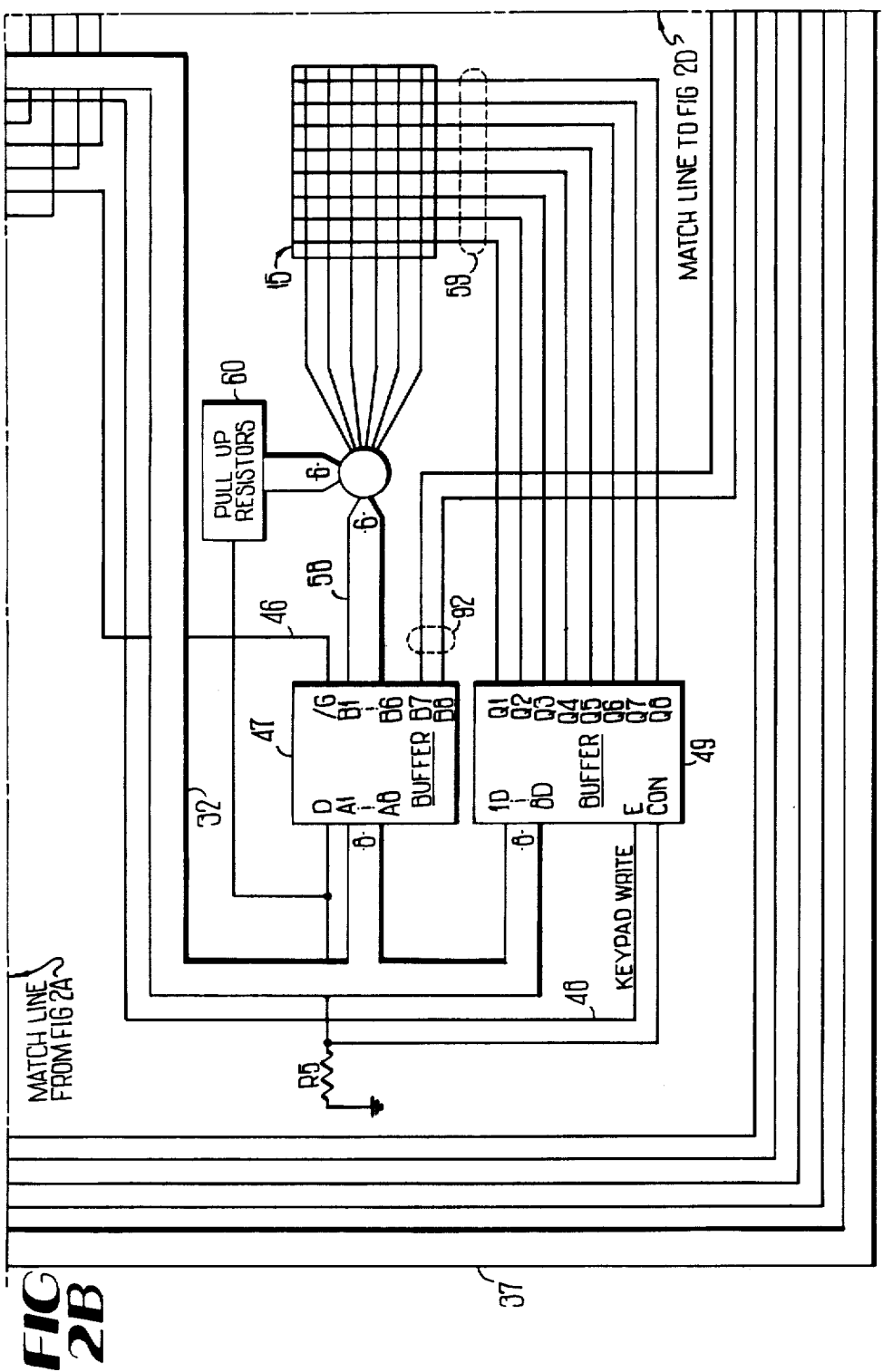

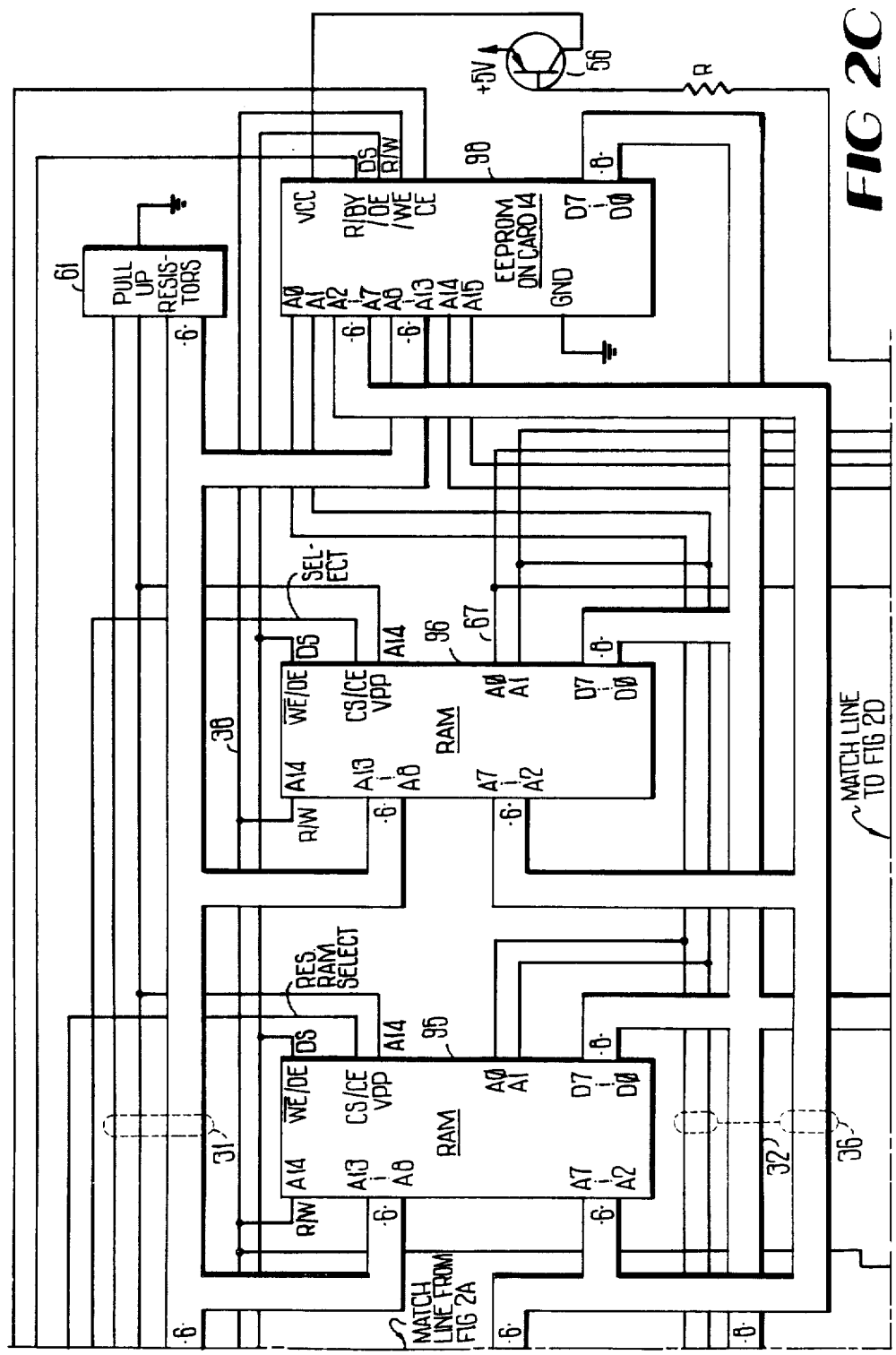

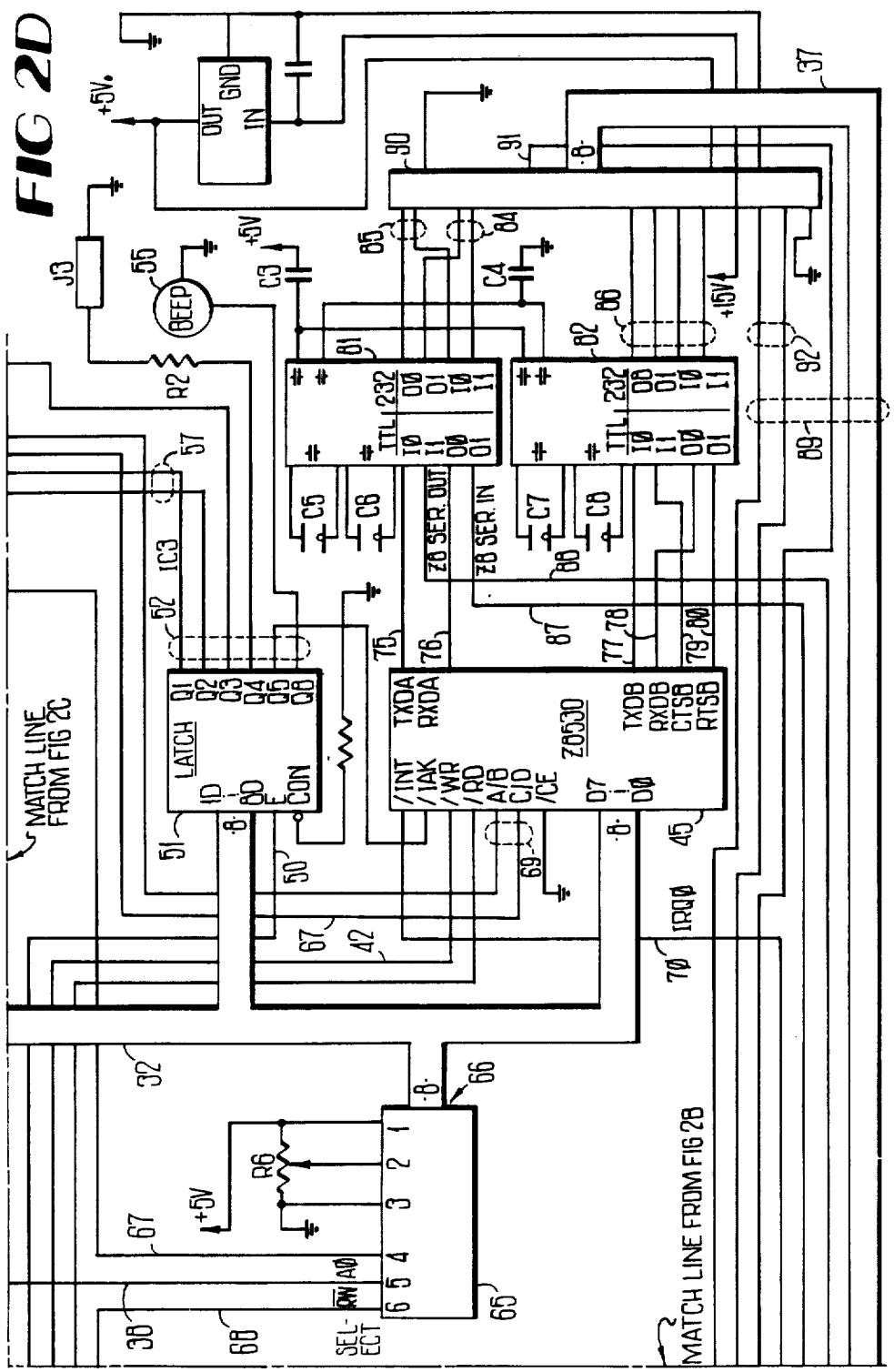

DEDICATED PROGRAMMABLE CONTROLLER FOR INTERACTIVE VIDEO DISC SYSTEM

TECHNICAL FIELD

The present invention relates to the field of programmable controllers for interactive video disc systems and in particular is an inexpensive dedicated controller for an interactive video disc system which is capable of controlling a plurality of different types of video disc playback apparatus having non-standard signaling formats and protocols and varying operational features.

BACKGROUND OF THE INVENTION

Laser video discs are one of the more useful high density information storage media commonly used today. Video discs store video and audio information in an arrangement which is fundamentally a digitized baseband composite television signal. In the United States, laser video discs store baseband representations of composite NTSC television signals including the luminance signal, the chroma signal modulated subcarrier, and the audio signal.

Commercially available video discs come in several sizes including a size mimicking the audio compact disc format, 8 inch and 12 inch diameters. Generally, the 12 inch video laser disc is considered the standard disc size. A standard 12 inch video disc stores 54,000 NTSC frames.

The construction of video disc playback equipment has become very sophisticated in recent years. Generally speaking, the playback apparatus of a video disc player includes a laser beam source and detector of reflected radiation, all carried on a traveler arm which moves radially over the surface of the video disc in a manner very similar to the movement of the magnetic heads over the surface of a magnetic disc used in a computer. The laser source illuminates the surface of the video disc over the area of a predetermined track. The digitized composite signal is stored by either the presence or absence of a burned light dispersing pit at predetermined intervals along the track. Most modern video disc players control the area of the disc illuminated by the laser by the use of precise stepping motors used to move the above referenced arm carrying the laser assembly radially over the disc surface. Also, servo controlled motors rotate the laser assembly and/or its optics about an axis parallel to a tangent to the disc. Therefore, stepping from frame to frame in a video disc player is accomplished by a combination of movement of the laser/optics assembly about the axis parallel to a tangent to the disc edge and moving the entire assembly radially over the surface of the disc.

This arrangement allows a number of advanced playback features in video disc players. Among the features are the familiar still frame action, in which a frame is constantly repeated so that a still image is provided to a video monitor receiving the reconstructed baseband signal. Additionally, slow motion can be accomplished by repeating the playback of each frame several time sequentially and then stepping to the next frame so that a clear image is achieved with an apparent slowing of motion.

As is known to those skilled in the art, the playback mechanisms commonly used for laser video disc lend themselves very nicely to storing large quantities of information on a frame by frame basis. In other words, rather than make the conventional use of stored television signals, that is providing a recording of moving pictures, video discs are well adapted to storing significant quantities of written and/or still pictorial information in each frame.

It is also well known that, as a result of the above described playback mechanism, video discs are, by their nature and the nature of the playback apparatus, suitable for being operated as either a random access playback device or a sequential access playback device. However, like magnetic disks on a computer, the random access operation of the video disc may be considered a quasi-random access. It is termed quasi-random access in the sense that the access time for any particular track of information on the disc's surface is a function of the distance between the current location of the playback transducer and the location of the track sought. However, the modern video disc playback apparatus is operated by stepping motors of sufficient precision so that any single frame of the disc may be individually sought and played back on a repeated basis, and the machine can be instructed to step from frame X to frame Y, where X and Y are any two numbers within the range of the number of frames stored on the disc.

While modern video disc playback equipment has many operational features in common, it is an unfortunate fact of the current state of technology and the consumer market for these products that there is no standardization with respect to control signals provided to a video disc playback apparatus which implement particular functions. Three generally stated levels of control of video disc playback are commonly recognized among those skilled in the art. Level 1 consists of typical television playback functions such as start, stop, scan forward, step to particular track, etc. These may be thought of as the type of playback functions typically provided in a home laser video disc system with a hand held controller for playing back recorded entertainment programs.

Level 2 of video disc playback control consists of a predetermined format of digital information stored on predetermined tracks of the video discs. With level 2 control, the digital control information is read from predetermined tracks at the beginning of playback and stored in a memory within the video disc player. Once this information has been loaded, the memory and a controller within the disc player control the sequence of playback operations according to the codes stored on the above referenced predetermined tracks.

Level 3 control represents interactive control through a control port connected to an external device.

While there is much commonality among playback functions which are implemented by video disc players, it is an unfortunate fact that there is no standardization of level 3 control among various manufacturers. In other words, the physical connectors and the electrical signaling schemes for providing level 3 control to video disc players is non-standard. Thus, the number of electrical conductors, or pins, at the control port of different players varies, as does the particular way in which the pins control the apparatus, and the electrical signaling protocols.

Among popular laser video disc playback devices currently available in the United States, there are three quasi-standard classes of level 3 control port provided by video disc player manufacturers. The first is serial communications implemented through a standard RS-232 serial port. The second quasi-standard is a bidirectional parallel latched 8 bit input/output port. This type of interface is one for which the controlling external device writes bits to the 8 bit parallel I/O port and reads certain bits from the port as acknowledgement signals or indications from the player as to its current status.

The third quasi-standard is a serial interface port using TTL logic levels and a dedicated acknowledge output line. This is one of the more troublesome type of control ports to deal with for standard serial communications devices. First, the logic levels are TTL rather than the standard 10 to 12 volt swing between 0 and 1 logic levels specified in RS-232. Second, the use of the acknowledge line alone provides only limited information as to the status of the player. Third, the waveform for these serial ports are non-standard. This type of control port has a dedicated acknowledge line which produces a particular logic level to acknowledge receipt of a command through the serial input line. The significance of the acknowledge command can vary depending on the command given to the player.

From this description it will be appreciated by those skilled in the art that there is a great diversity of electrical and signal protocol characteristics among the three quasi-standard types of level 3 control ports on commercially available video disc players.

Because of the quasi-random access nature of the video disc, it has become popular as a high density medium for storing teaching, training, and testing materials which may be operated by individuals at learning/testing stations consisting of a video disc player and a monitor for reproducing visual images corresponding to the recored composite signals. Such an arrangement is particularly useful for programmed instruction learning where the user is given a certain quantum of information, and then tested on his or her comprehension thereof by a short series of questions. The next sequence of images provided to the user in such an arrangement is determined by the user's responses to the previous questions, that is, the extent to which the user's responses indicated that they comprehended the previously provided information.

Designers of such instructional and testing arrangements can also opt for various responses of the machine, including making the user select answers until the right one is selected, or showing the user the correct answer and redisplaying the pertinent material in response to an incorrect answer.

Naturally, instructional and testing schemes of this type require a level 3 control to the video disc player. This is because the particular sequence in which the frames stored on the disc will be played back is not predetermined at the time playback commences. Since such testing schemes normally provide many possible branches along the way, there are a very large number of possible sequences of frame playback in such a system.

The need for level 3 control for practical instructional and testing apparatus, combined with the proliferation of various control signals and physical configurations for video disc player control ports, has lead to a situation in which most instructional and testing materials prepared for video disc playback systems are prepared only for a particular video disc size/format and for a particular video disc player. Furthermore, it will be apparent to those skilled in the art that general purpose programmable digital computers are very useful in providing the necessary level 3 control signals to the video disc player.

The fundamental problem with use of general purpose digital computers to provide level 3 control to video disc players for interactive operation thereof is expense and complexity. One of the basic advantages of using interactive video disc playback systems for instructional and testing purposes is the ability to provide a plurality of work stations at which a number of people may make use of the apparatus. This arrangement allows each user to proceed through the material in question at his or her own pace and obtain assistance based on user provided responses during the course of operation of the interactive device. Additionally, it allows the student to selectively repeat display of particular frames if they desire. However, by the very nature of the systems, the apparatus providing the interactive level 3 control to the video disc player must be duplicated at each station. Even as IBM PC compatible type machines have prices moving toward $1,000, they are still very expensive controlling devices.

Additionally, most personal computers which are used as the general purpose programmable digital computers to implement such controllers lack standard circuitry for conveniently producing TTL level serial ports and are thus limited in their ability to control the third type of quasi-standard interface described hereinabove without the use of additional circuitry. This requires a system implemented in this manner, which has the capability of controlling the third type of player control described above, to add the cost of additional custom circuitry on to the already large cost of the computer itself.

Furthermore, general purpose digital computers tend to be perceived as overly complex. This severely limits the usefulness of the apparatus used to implement interactive video disc instructions.

For example, many large companies or organizations will have television monitors available in a plurality of locations and it is highly desirable to be able to move the video disc player, a relatively small device, and the controller from one location to the other for use at different physical locations. The ability to practically do this is diminished by using general purpose digital computers for controllers. Because of this, interactive video disc instructional equipment has tended to be prohibitively expensive for many applications.

Furthermore, developers of course material have therefore tended to limit their materials to software instructions and discs which may only be played on a single playback system.

Additionally, it has generally been considered necessary to employ expensive general purpose digital computers in interactive video disc systems which display recorded information. Interactive video disc systems which can store records of the user response for later analysis are very useful in marketing surveys, point of sale response testing, and other activities in addition to the academic/instructional setting described hereinabove. Also, these machines are very useful in providing information stations at locations where people need directions, assistance, and the like.

Therefore, there is a serious need for an economical, lightweight and compact controller for providing level 3 control to video disc playback apparatus in interactive video systems which is usable to control a plurality of different types of video disc playback apparatus. In particular, there is a need for such a controller which provides transportability of the video disc and the control instructions defining the instructional or testing procedure among a plurality of different playback devices.

SUMMARY OF THE PRESENT INVENTION

The present invention provides a compact, economical dedicated level 3 video disc playback controller which overcomes the above stated drawbacks of the prior art.

The flow control for any particular interactive instructional or testing routine which is to be implemented with a video disc player may normally be expressed in a form which lends itself to implementation by an algorithmic state machine. Algorithmic state machines are, as known to those skilled in the art, devices which make state transitions based solely on the present state of the machine and the state of one or more inputs to the machine. Thus the present state and the inputs uniquely determine the next state to which the machine steps. In an interactive video disc system, the particular frame currently being displayed may be thought of as the analog of the present state, and user provided inputs, normally through a keyboard, provide the inputs to the state machine which determine the next state to which it moves, i.e. the next frame to be displayed.

Since the frame number for a particular disc corresponds to the present state, and the user responses in an interactive system correspond to the state machine inputs, then it will be clear that adoption of the state machine model requires that the signals for forcing the machine to its next state must go through the non-standard control interface on the particular video disc player being used. Stated another way, the entire interactive video disc instructional system may be modeled as an algorithmic state machine. However, the signals within the machine that detect, or store the value of the present state and process the user inputs must all be translated into signals which go through the control interface of a particular video disc player to move the machine to the next state, i.e. to cause it to select another frame. This being the case, the lack of a standard physical and electrical level 3 control interface provided on video disc players of various manufacturers has caused a bottleneck in the development of readily transportable materials for use in training and testing applications.

In the programs for developing courseware developed by the inventors of the present invention (which programs do not per se constitute a part of the present invention) options are given to set flags or pointers indicating when the program control has reached a certain point in the past. Thus, if the algorithmic state machine model is adopted, it will be appreciated that there is more than one possible machine state which may exist for the machine's current display of any particular frame. However, the current frame, together with the setting of any such flags or pointers, will uniquely define a machine state and the algorithmic state machine model holds true. When such an option is provided in the instructions of the courseware, it is simply possible for there to be more than one machine state for any given currently displayed frame.

As used in the specification, the term "courseware" refers to both computer firmware for controlling the frame selection process in response to user inputs and to the visual images stored on the video disc itself. Microprocessor or microcomputer courseware refers to the above stated firmware, and video courseware refers to the signals on the disc.

The natural result of the above noted situation is that the inability and/or unwillingness among the various manufacturers of video disc playback equipment to standardize the level 3 control ports has caused a serious bottleneck to users and consumers of the equipment who simply do not care about the particular physical and electrical configuration of the control port, but only want the entire system to operate properly.

Once the video courseware is provided on disc, and the microcomputer courseware to implement the program has been conceptualized at an algorithmic level, the prior art has tended to translate the output signals from the microcomputer courseware into signals dedicated for controlling a specific video disc playback machine. It is believed by the inventor of the present invention that certain application programs designed to operate to the serial port of a general purpose digital computer have provided translation tables for various output signals to the control ports of various video disc players. However, the prior art has not provided a simple and economical system for meeting the basic need of the prior art, that of decoupling the logical state transitions to be made by the interactive system from the particular implementation of the system through the level 3 control port of a particular machine.

The present invention provides a method and apparatus for controlling the video disc player which provides the greatly needed decoupling so that, within the limits of the playback machine's technical capability and the physical size of the video disc media, the video courseware and the microcomputer courseware for any given instructional course is completely transportable among a large number of playback machines. This is accomplished by providing a set of video disc control ("VDC") characterization signals, in tabular form, which maps a set of standard video disc player command signals into electrical signals of particular levels on particular ones of a plurality of electrical conductors for connecting to the control port on the particular machine associated with each set of the VDC characterization signals. Normally the level 3 control signals are serial data signals on a particular pin of the control port of the disc player. In other words, a standard command such as "step to frame 100" will have table entries corresponding to the number of different types of control ports which the table support. Thus, if there are ten separate electrical and physical control port configurations represented in the table, there will be an entry for each control port configuration and each standard video command.

The present invention stores a user selectable VDC selection signal which indicates the type of video disc playback apparatus (and thus electrical and physical control port configuration) to which the controller is connected. Once this step is accomplished, the apparatus makes an appropriate selection, based on the VDC selection signal, from the VDC characterization table to provide the proper electrical signals out to the physical connector attached to the controller.

Since the combination of VDC selection signal and VDC characterization signals completely translate the standard video disc player command signals into appropriate electrical control outputs for the selected video disc player, it will be appreciated that the microcomputer courseware need only be configured to provide the controller with standard video disc playback command signals and the controller of the present invention will take care of the problems associated with nonstandard control ports on a plurality of different types of video disc players.

In other words, the present invention overcomes one of the major drawbacks of the prior art by making the particular characteristics of the control port on the video disc player transparent to the user. By this arrangement, the microcomputer courseware and the video courseware are completely transportable among a plurality of video disc playback machines when the controller of the present invention is employed.

In a preferred form of the present invention, particularly useful in academic instructional and testing applications or public information stations, at least a portion of the microcomputer courseware is provided to the machine on a plugin memory element, preferably a surface mounted electrically erasable programmable read only memory mounted on stiff substrate such as plastic, which approximates the size of a conventional credit card. In this embodiment of the invention, user identification signals are stored at particular addresses of the EEPROM. User identification signals can be used to identify, for example, student users who are employing the instructional/testing system implemented in the interactive video disc playback system. From time to time, the students will insert his or her identification/memory card containing the EEPROM and will take a test.

This embodiment of the present invention stores signals corresponding to the user scores on such tests. Other identification/memory cards in this embodiment of the invention have access codes included as part of the user identification code which allows, for example, a professor in charge of the instruction and grading for the course to insert his or her memory/identification card into an appropriate plug on the present invention and to provide user inputs which cause the scoring signals for a plurality of students to be written onto the professor's memory/identification card. This can then be taken to an appropriate reading device which will read out the scores and allow the professor to determine students' grades for the course material embodied by the courseware.

Thus, it is an object of the present invention to provide a dedicated economical level 3 video disc controller apparatus, particularly suitable for interactive video disc instruction and testing apparatus.

It is a further object of the present invention to provide an economical video disc controller which allows course designers to provide microcomputer courseware which issues standard video playback commands and predetermined video courseware, the combination of which is transportable among a plurality of different video disc playback machines having distinct electrical and physical characteristics for their their level 3 control ports.

It is a further object of the present invention to provide an interactive video disc controller which selectively stores result information from user provided inputs, together with identification signals from a plug inserted identification/memory card.

It is still a further object of the present invention to provide such a video disc playback controller which also is responsive to predetermined identification codes to allow selective writing of stored information from the controller onto an identification/memory card containing the proper predetermined identification codes.

It is still a further object of the present invention to provide a video disc playback controller for an interactive video disc instructional system which is user transparent to the physical and electrical characteristics of the control port on the particular video disc playback machine in use in the interactive system.

It is an object of the present invention to provide an inexpensive dedicated controller with the capability of storing using input responses which responses may be later selectively downloaded for further analysis and processing.

It is still a further object of the present invention to provide a dedicated interactive video disc laser system controller which allows selective storage of microcomputer courseware on a compact medium, such as an EEPROM surface mounted on a piece of stiff plastic, which can be carried about by the user for selective insertion into the controller.

It is still a further object of the present invention to provide such a controller which can also write information to the compact memory medium which will store information on the present state of the controller at the time the writing takes place and to provide a record of data which may be removed via the EEPROM for reading and analysis at another location.

While the preferred embodiment of the present invention is a machine for controlling currently available video laser discs, it should be understood that a general purpose of the present invention is to provide a novel and useful controller for interactive systems using any optical disc media. Furthermore, the principles of the present invention may be applied to any random access or quasi-random access optical storage device useful in implementing the types of interactive systems described in this specification.

That the present invention overcomes the drawbacks of the prior art noted above, and meets the foregoing objects will be appreciated from the Detailed Description of the Preferred Embodiment below.

DETAILED DESCRIPTION

Figure 1:
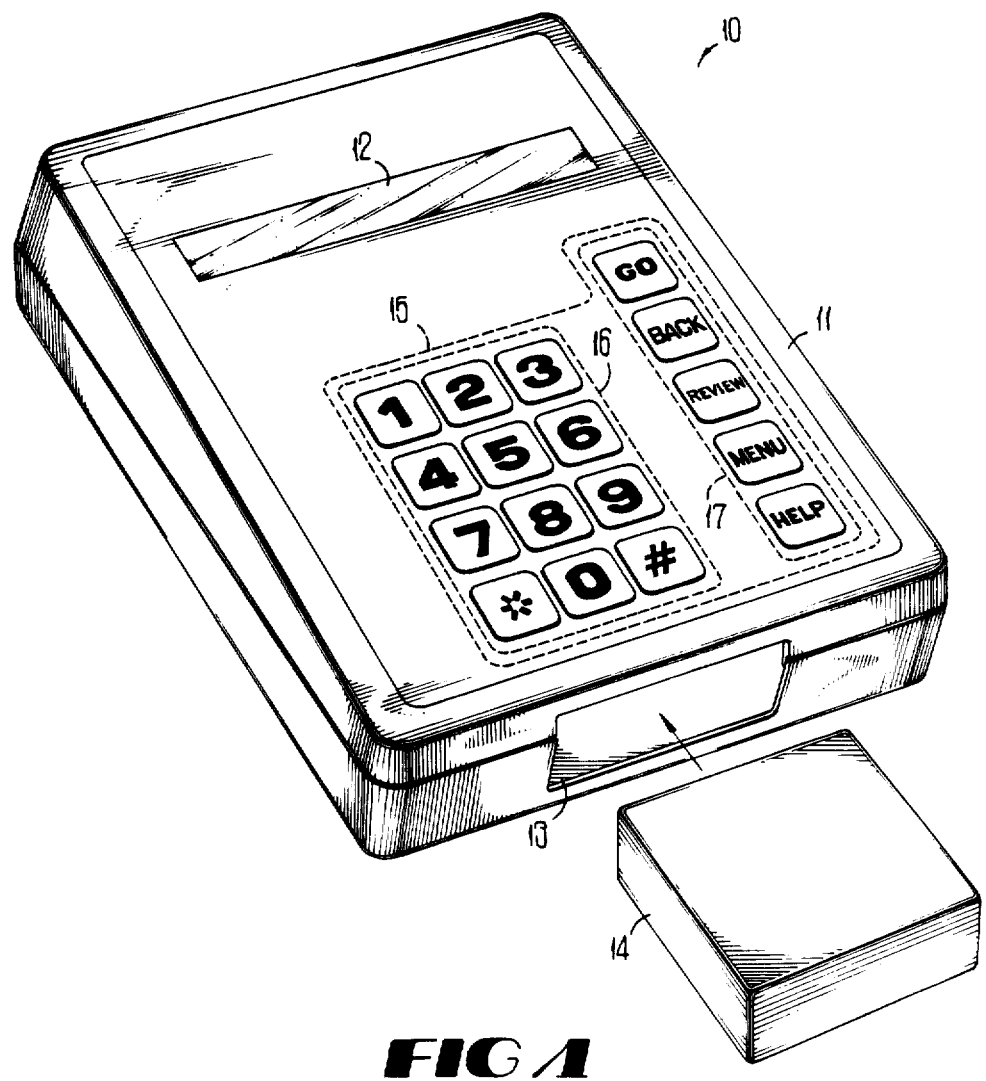
FIG. 1 is a pictorial view of the preferred embodiment of the present invention.

Turning next to the drawing figures in which like numerals represent like parts, the preferred embodiment will now be described in detail. FIG. 1 is a pictorial view of the exterior of the preferred embodiment of the present invention shown generally at 10. The preferred embodiment is contained within a housing 11 having a window 12 for an LCD display element.

In the preferred embodiment, the upper surface of housing 11 measures approximately 14 centimeters by 8 centimeters and will thus be seen to meet the above noted object to provide a compact controller.

Window 12 is to provide visible access to a dot matrix LCD display element in which simple messages are provided to the user during operation of the preferred embodiment. Also, a slot 13 containing a plug connector is provided at the front of the preferred embodiment for accepting EEPROM and PROM memory cards and cartridges 14 of a type described hereinbelow. These cards and cartridges contain the microcomputer courseware, and other information, described in greater detail in this specification. Additionally, there is a standard type DB25 25 pin female connector (not shown) disposed on the rear of controller 10 which is used to interconnect the preferred embodiment with the video disc player being controlled and also to implement connections to digital computing and other serial I/O device described hereinbelow.

The upper surface of housing 11 has a keypad 15 disposed thereon consisting of a conventional 4×3 keypad 16, which mimics a standard telephone keypad and a 5 key array 17 of special control keys used the preferred embodiment. In the preferred embodiment, keypad 15 is selectively operated by the user to provide user response signals in response to messages displayed in display window 12 and to messages produced on the monitor screen by the video courseware in use.

The significance of the signals from 4×3 keypad 16 is controlled by the microcomputer courseware used with the instructional course in operation at any given time. The user response signals from subpad 17 provide general video playback command signals and signals to the operating system of the preferred embodiment to provide, for example, a menu of options and help messages in LCD window 12, or on the monitor screen.

As a brief example, on startup of any interactive instructional program using particular video courseware and controlled by microcomputer courseware, the preferred embodiment first checks to ascertain if a VDC selection signal has been stored. If none has, the user is first prompted with a menu of the video disc player types which are supported by the preferred embodiment, and asked to select one. The user depresses one of the keys on subpad 17 when the name of the particular video disc playback apparatus used in the system is displayed, and the VDC selection signal is then stored by the preferred embodiment. So long as operation of the preferred embodiment continues, it will always check the VDC selection signal and use this stored value to select appropriate output signals from the VDC characterization values to thus provide the correct electrical control signals to the video disc player in use.

Figure 2A:
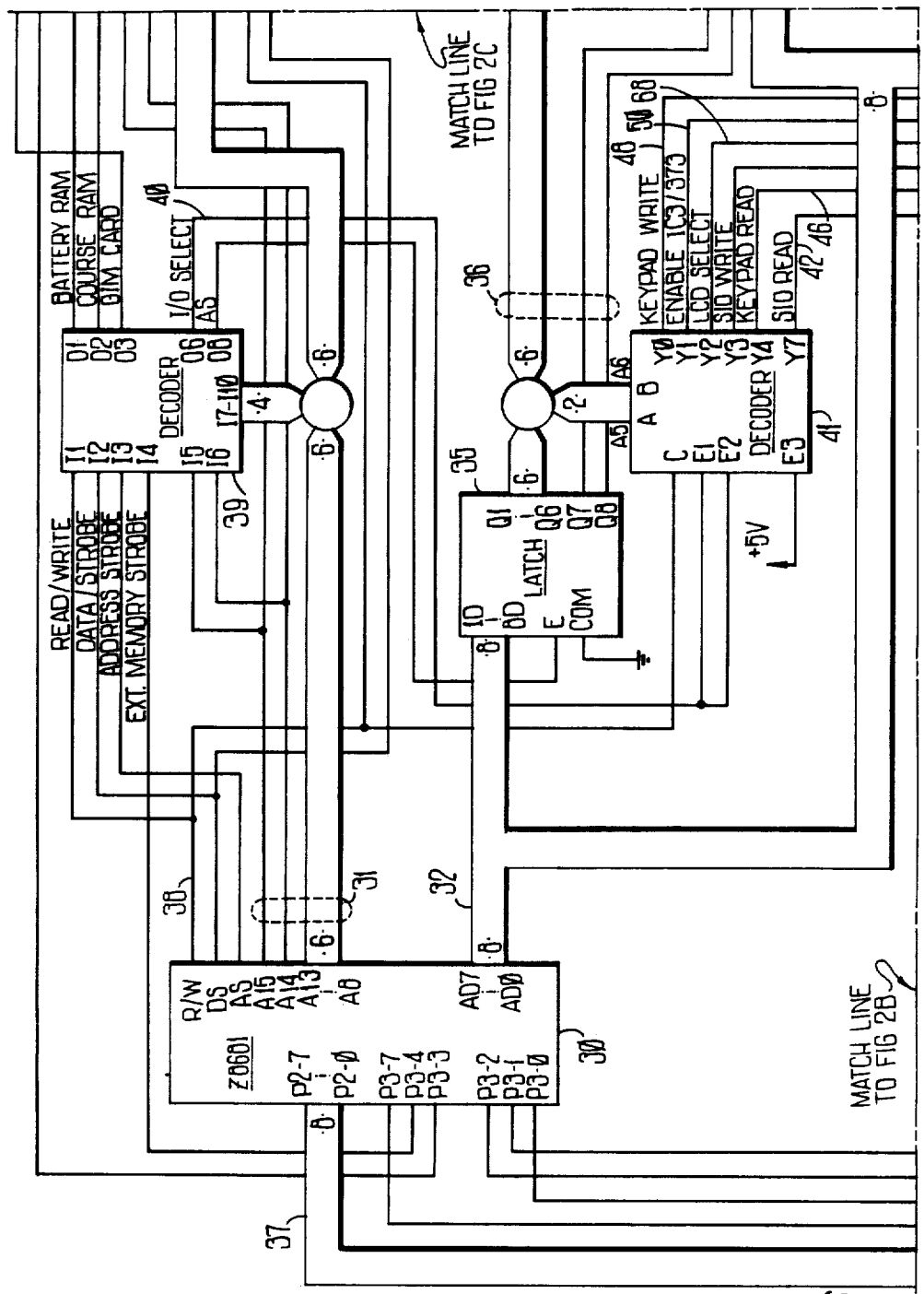
FIG. 2, consisting of FIGS. 2A through 2D, is a schematic diagram of the preferred embodiment of the present invention.

FIG. 2, which consists of FIGS. 2A through 2D, is a schematic diagram of the preferred embodiment. First, from an overview of FIG. 2, it will be appreciated that the preferred embodiment meets object of implementing a simple and inexpensive controller. It uses a relatively small number of widely available parts and thus can be built much less expensively than general purpose programmable digital computers which have been used to implement video disc playback controllers for interactive systems heretofore.

The preferred embodiment is built around microcomputer 30. In the preferred embodiment, microcomputer 30 is embodied by a type Z8681 one chip microcomputer of the Z8 family currently manufactured by Zilog, Inc. of Cupertino, California. As is known to those skilled in the art, the Z8681 is a member of the Z8 having no internal mask programmed read only memory. As with the Z8 family, four 8 bit ports, conventionally numbered in literature published by the manufacturer as port O-3, are provided on microcomputer 30. The Zilog Components Data Book, published in 1985 by Zilog, Inc. of Cupertino, California, is hereby incorporated by reference, exactly as if set forth herein.

The output lines from port O are shown collectively at 31 in FIG. 2A. In the preferred embodiment, 8 bit bus 31 primary function is to provide the eight highest order address bits for the system address bus. The 8 bit bus attached to port 1 is shown as 32 in FIG. 2A. In the preferred embodiment, port serves as both the data bus and the output bus for the eight lowest order address bits which are stored in a conventional manner during each addressing function in low order address byte latch 35. Bus 32 is connected to port 1 of microcomputer 30 and also serves as the bidirectional data bus for microcomputer 30. Thus, it will be appreciated that elements attached to 8 bit bus 32 are connected to the system data bus and those connected to the 8 bit bus 36, connected to the output side of low order address byte latch 35, are connected to the least significant 8 bits of the system address bus.

Port 2 of microcomputer 30 is connected to an 8 bit input/output bus shown as 37. As is known to those skilled in the art, the port 2 pins of the Z8 family of microcomputers are bidirectional I/O ports and are bit programmable. Therefore, lines 37 connected to port 2 of the Z8 are particularly suited for writing control outputs to the video disc player connected to the preferred embodiment. Indeed, this is what the majority of the port 2 lines of bus 37 are used for in the preferred embodiment.

Other well known input/output lines are provided to the balance of the system of the preferred embodiment in a manner well known to those skilled in the art. For example, the read/write strobe output which appears on line 38 is connected to appropriate inputs of the memory devices shown elsewhere on FIGS. 2A and 2C and to memory decoder 39. One output of memory decoder 39 is the I/O select output on line 40 which is provided to two of the enable inputs on I/O selector 41. Those skilled in the art will recognize I/O selector 41 as a 3 bit to 1-of- 8 which selects one of the system I/O device for reading or writing. In a conventional manner, the decoded output on line 42 selects serial input/output reading by enabling the read function on type 8530 dual USART or communications controller 45 (FIG. 2D). Thus, when this line is enabled, microcomputer 30 is enabled to read or writ serial data from dual USART 45. Similarly, line 46 enables keyboard read buffer 47 by placing its outputs in a low impedance state, thus placing the data stored in this device on to date bus 32. Output line 48 from decoder 41 enables keypad write latch 49. Line 50 enables yet another latch 51 which writes an 8 bit state to its outputs shown collectively at 52. (FIG. 2D. )

The output from latch 51 enables various devices such as an audible beeper 55, power supply control transistor 56 for the EEPROM card, and provides partitioning of the address space of the EEPROM or PROM memory card through a pair of lines shown as 57.

Keypad 15 is shown on FIG. 2B and is a cross-point matrix keypad wherein depression of a key activates a connection between one of row lines 58 and column lines 59. As will be apparent to those skilled in the art, the preferred embodiment detects user response inputs from keypad 15 by the conventional scheme of writing a particular logical value to one of column lines 59 and then reading the output from keypad read buffer 47 to determine if one of the row lines is in the same state. Since microcomputer 30 knowns the particular line enabled by keypad write buffer 49 at any given time, the particular one of lines 58 which carries the same state allows the microcomputer 30 to uniquely determine the keypad pressed. Also, in a conventional manner, states in which two keys are depressed at the same time are ignored. Appropriate selection of timing for the keyboard scanning routine, software debouncing is accomplished in a conventional manner. A standard resistor array shown at 60 provides pull-up to keyboard row lines 58.

A plug connector 65 is shown on FIG. 2D for the LCD display which appears under window 12 (FIG.1). A tap to data bus 32 is brought in to the LCD plug at 66. Read/write strobe line 38 is connected to one pin, the lowest order address bit (AO) is brought in on line 67 from the latched low order address byte bus 36 (FIG. 2C) and a decoded select input is provided on line 68 from I/O decoder 41 (FIG. 2A).

The LCD display used in the preferred embodiment is a dot matrix display of a conventional type which the display circuitry contains appropriate addressing and memory circuits. Both data for display and address information is bought in from data bus 32 at 66 on plug connector 65. The system read/write strobe on line 38 causes writing of date to be displayed into the memory elements of the display. The lowest order address bit on line 67 controls whether the data present at 66 is data to be displayed, or address data designating the position within the LCD display at which the data is to shown.

Circuit 45 shown of FIG. 2D is a type Z8530 serial communications controller. As noted hereinabove, this device essentially serves the function as a two channel, or dual, universal synchronous/asynchronous receiver transmitter (USART). The operation of the type Z8530 dual USART is described in detail in literature provided by the manufacturer of this device and similar devices. For example, its operation is described in pages 839 through 860 of Zilog Components Date Book published in 1985 by Zilog Corporation, which is hereby incorporated by reference as is fully set forth herein. For purposes of the current specification, it need only be noted that communications controller 45 communicates with microcmputer 30 through the following conventional connections.

A/B and D/C inputs, shown collectively on line pair 69 are connected to the two lowest order address bits of address bus 36. These inputs control selection of the A or B communications channel and as detemination of whether the data present on data bus 32 (when microcomputer 30 is communicating which controller 45) is data for communication channel or a command to the controller 45. Similarly, an interrupt request output is brought out on line 70 and provided to pin 2 of port 3 of microcomputer 30 which responds to interrupt request. In a conventional manner, communications controller 45 requests an interrupt to microcmputer 30 when it has date stored in appropriate registers which need to be passed to the microcomputer. An interrupt acknowledge signal is provided on line 71 which is one of the collective outputs shown as 52 from latch 51. Thus the interrupt acknowledge is written by microcomputer 30 to a paritcular address location when the signal is required.

Communication controller 45 controls serial communication into and out of the preferred embodiment. In particular, it controls RS-232 serial data links provided to various video disc players which require same. Communications controller 45 also provides for serial communication with an external computing device for applications and operations, described hereinbelow, which require same.

As is known to those skilled in the art, EIA Standard RS-232 for serial communications specify a relatively large number of signal conductors. It is also known to those skilled in the art that very few of the signals are actually provided or deteced in a very large majority of the real world implementations of an RS-232 communications port. Indeed, implementation of the full RS-232 specification in this day and time is a dangerous activity since there are very few devices which implement the entire specification. Therefore, equipment expecting responses from and providing outputs to all of the RS-232 defined signal lines is unlikely to work properly when connected to most commercially available devices. In acknowledgement of this, the two serial channels of communications controller 45 are alternately configured to bring out two signal lines and four signal lines, excluding the signal grounds. The A channel only brings outs transmit data line 75 and receive data line 76. The B channel brings out transmit data line 77 and receive data line 78. It also provides clear to send signal (CTS) on line 79 and a request to send signal on line 80. These RS-232 signal lines are provided to line driver circuits 81 and 82 which perform conventional level shifting functions between the TTL logic levels on the inputs and outputs of communication controlled 45 and RS-232 levels which appear at RS-232 ports 85 and 86.

Two lines designated as 87 and 88 are provided to line driver circuit 81. These lines are connected to lines 0 and 7, respectively, of port 3 of microcomputer 30 (FIG. 2A). Pin 0 of port 3 is an input line and pin 7 of port 3 is an output line. As will be known to those skilled in the art, these pins of port 3 of a Z8 type microcomputer are commonly used, as they are in the preferred embodiment, to directly implement the signals for a serial communications link. On the RS-232 side (the right hand side of the drawing figure) of FIG. 2D, these lines come through as serial port 84. Thus, it will be appreciated that serial port 84 is a two line (that is, transmit data and receive data) RS-232 level serial port which is controlled directly from port 3 of microcomputer 30 (FIG. 2A). Therefore, there are three RS-232 serial ports 84 through 86 provided in the preferred embodiment. Two of these ports, 85 and 86, are driven through serial communications controller 45, and the other port 84 is controlled directly from port 3 of the microcomputer.

The 8 line comprising the RS-232 ports together with 11 TTL level lines shown collectively as 89, are provided to the electrical conductors of a DB-25 connector represented at 90. As shown on FIG. 2D, an 8 line subset of lines 89 is electrially identical to bus 37 from port 2 of microcomputer 30 (FIG. 2A). Thus, 8 of the conductor provided to DB25 connector 90 are the bit programmable outputs from port 2 of the microcomputer. Eight bit bus 37 is brought out to connector 90 for the control of the second type of quasi-standard level 3 control port for a video disc player, as described hereinabove. It should be recalled that this is the type of quasi-standard port which requires 8 bit latched parallel I/O to the control port on the disc player. Therefore, when the preferred embodiment is connected to video disc players of this type, control to the video disc player is provided directly through 8 bit bus 37. When used with these type of machines, instructions to the disc player written out on bus 37 and the state of bus 37 is read back to microcomputer 30 for detecting acknowledgement and state signls from the disc player.

The third type of quasi-standard level 3 control described hereinabove is implemented through one line of bus 37 and line 91. It should be recalled from the foregoing description that the third type of level 3 control is a TTL level serial data output to the video disc player combined with a dedicated acknowledge line input from the disc player. One of the bit programmable lines on bus 37 is used to implement the serial data output to video disc players of this type through DB25 connector 90. Line 91 is brought from connector 90 to pin 1 of port 3 of microcomputer 30 (FIG. 2A). This seves as a second interrupt request line which is used to generate interrupts in response to state transitions on the acknowledge output of this type of video disc player.

Additionally, a pair 92 of two currently unused TTL input/output lines are provided to keypad read buffer 47. These are connected through buffer 47 on to two lines of data bus 32. These lines are available to detect any additional TTL level outputs which may be provided at the level 3 control port of a video disc player designed in the future or other real world signals related to the system.

It will be appreciated by those skilled in the art that DB-25 connector 90 provides a connection means which includes a plurality of electrical signal pads for connecting the controller of the preferred embodiment to a control port on at least one of the video disc players supported by the preferred embodiment.

Those skilled in the art will quickly recognize that the signal lines 18 coming into DB-25 connector 90 do not resemble any standard implementation of RS-232, or other common uses of DB-25 connectors. Since it is one object of the present invention to keep the dedicated controller small, a non-standard set of electrical signals was provided to a DB-25 connector to provide both two channels of serial input/output, and all the necessary input and output signal lines for connection to the control ports of various video disc players. Therefore, the preferred embodiment of the present invention is designed to be used with non-standard cabling connector which interconnect the various lines of DB-25 connector 90 to the appropriate characteristic control port connector used by various video disc manufacturers and to standard implementations of RS-232 on external devces. The techniques for selecting and making such non-standard cables 18 are well knwon to those skilled in the art.

Additionally, it should be appreciated by those skilled in the art that connector 90, together with the non-standard cabling described above, is used to interconnect the preferred embodiment with up to 5 ports. Three of the ports are RS-232 level serial ports, one port is a TTL serial port with the knowledge line 91, and the last port is the 8 bit TTL level parallel port implemented through bus 37, plus the pair 92 of TTL input/output lines.

It should be noted that the TTL level serial port described herein is currently designed for unidirectional serial transmission since this is all that is currently required for TTL level serial communication among commercially available video disc players. However, bidirectional communications could br implemented by the use of appropriate interrupt service routines for servicing interrupts generated by transitions on line 91 to directly decode incoming serial data.

The memory elements used in the preferred embodiment are shown on FIGS. 2C and 2D. Turning first to FIG. 2C, the preferred embodiment employs a pair of 32K static RAM chips 95 and 96. As noted hereinabove, these are selectively enable by memory decoder 39. In this specification, RAM 95 is referred to as battery RAM since its contents are protected by a conventional battery backup and clock circuit (not shown). In the preferred embodiment, the battery backup and clock circuit is mounted in the socket. Random access memory 96 is referred to as the course RAM since it is normally used to contain the microcmputer courseware which controls the algorithmic interaction between the display of frames from the video courseware, the user response signals provided from keyboard 15 and other transient information.

One predetermined address of RAM 95 stores the VDC selection signal described hereinabove, which indicates the particular type of video disc player to which the preferred embodiment is connected.

Additionally, portions of RAM 95 are set aside for the storage of VDC characterization signals described hereinabove. Lastly, RAM 95 contains operating system control instructions for microcmputer 30 for executing all of its repetitive standard functions which are independent of the instructions contained in the microcomputer courseware.

RAM 96 is referred to as the course RAM since it is normally used to store program instruction signals to microcomputer 30 for implementing the particular course in question. It will thus be appreciated that at least one address of RAM 95 comprises a first storage means for storing the VDC selection signal. Additional address locations of RAM 95 comprise a second storage means for storing a plurality of sets of VDC characterization signals, each set of which corresponds to one of a plurality of video disc playback machines. Lastly, RAM 95 comprises a third storage means for providing control signals to microcomputer 30.

The memory shown on FIG. 2C is is preferbly implemented by the plug in surface mounted PROM and EEPROM memory described hereinabove and represented at 98 on the drawing figures. As may be seen from inspection of FIG. 2C, low order 8 bits of the address inputs to EEPROM 98 are connected to the low order latched address bus 36. The next six most significant address bits are connected to the six lowest order bits of the high order address bus 31 (FIG. 2A). The two most significant address inputs to EEPROM 98 are connected to line to line pair 57 and thus the states on these, lines, latched into latch 51, partition memory 98 into four segments.

It should be understood that while memory 98 is shown as a wired device on FIG. 2C, it is implemented by a plug connected device in the preferred embodiment and thus the representation on the drawing figure is solely as that of an electrical schematic.

There are several uses of memory 98 which lead to some of the novel improved features of the present invention. For example, certain addresses of memory 98 are dedicated to storing the following signals. At least one address stores a card type identification signal for the EEPROM memory. Additionally, certain addresses of memory 98 are set aside for used identification codes. Among the card types defined by the present invention are a course card which contains microcomputer courseware, a user card, an administrator card, and a system card. It the card is a course card, and appropriate signals are provided to keypad 15, microcomputer 30 will transfer the program control signals of the microcomputer courseware into course RAM 96. Alternately, microcomputer 30 may direclty read the program instructions from a course card over data bus 32.

In many applications of the preferred embodiment, the user identification card identifies the particular user and enables that user to proceed with operation of the interactive system. If it is a testing and/or academic construction setting, the system also stores in battery RAM 95 an indication of the user identification from EEPROM 98 and a data and time entry indicating the time of use. Whether or not this particular information is stored is controlled by the courseware in use by the operator of the system.

The definition of an administrative card identification signal is one which allows certain user data stored in battery RAM 95 to be downloaded and written to the EEPROM of memory 98 for offsite processing. From this it will be appreciated that additional addresses of battery RAM 95 constitute a fourth storage means contained within housing 11 (FIG. 1) for storing result data in response to user response signals provided from keyboard 15 as the student or other user interacts with the system. Additionally, for cards containing an administrative identification code, portions of EEPROM 98 comprise a fifth storage means contained within a descrete selectively connectable device which includes read/write memory for selectively storing the result data from batterys RAM 95 when the card is inserted and at least one predetermined user response signal is provided from keypad 15.

The definition of a system card identification is one which allows certain data stored on the EEPROM to be uploaded to the battery RAM to reprogram its functions and confirmation of this event download to the EEPROM.

Before proceeding to a description of the control flow of the preferred embodiment, a concrete examle of the above functions will be given. One excellent use for interactive video disc systems employing the preferred embodiment is that of academic instruction. Assume that appropriate video courseware and microcomputer courseware has been prepared by an instructor in such an environment. Further assume that a plurality of interactive video systems, each of which employs the preferred embodiment of the present invention as a controller, are provided at a location accessible to a plurality of students at various times during a predetermined academic term. In this environment, the instructor prepares appropriate video and microcomputer courseware. Each student is issued a card which contains a user identification signal stored in the EEPROM and also identifies it as a course card. Appropriate copies of the video courseware are made available at the locations where the interactive video discs are stored. Once the student user gets an opportunity to operate one of the systems, he or she selects a disc containing the appropriate courseware and inserts it into the video disc player (not shown). Microcomputer 30 then loads the course instructions from PROM card 98 into coures RAM 96 and checks the course identification code on the PROM card. The student inserts the course PROM card into the slot 13 (FIG. 1). The student is told to remove the course card and insert his or her EEPROM card into the slot 13 so that the card becomes the embodiment of memory 98 shown in FIG. 2B. Appropriate information, determined by the microcomputer courseware, stores information about the particular student's use of the system in battery RAM 95. The student may then proceed to go through the instructional routine defined by the coureware. It should also be noted that (solely under the control of the courseware) at the termination of each session, signals may be written out to the EEPROM card 98 indicating the point in the instructional sequence through which the student had proceded at the time the session was terminated. This allows the student to pick up at the appropriate portion of the course the next time the system is operated. From time to time, the courseware determines that tests should be given to the student under the control of the microcomputer courseware. At a time of the student's selection, the test is taken. The student's responses to the test question, together with an idenitfication of the particular student are storde in battery RAM 95.

At appropriate times during the academic term, the professor can proceed to each machine in the environment in question, and insert his or her EEPROM card containing an administrative identification code. Operation of an appropriate key from keypad 15 causes microcomputer 30 to check the administrative identification code, and upon confirmation of same, to download information a student identifications and test scores to the EEPROM 98. This information may then be taken to a compatible offsite data reading device for downloading and translation into text with student name and information allowing the professor to score the various tests.

Additionally, microcomputer courseware can be downloaded into course RAM 96 through either of serial ports 84 through 86. Futhermore, in an appropriate environment, student scoring information or the like may be downloaded through the serial ports if the courseware requires an appropriate password code to be entered through the serial port prior to transmitting restricted access data to the serial ports in a response to a request that it be provided.

Also, it should be understood that a very wide variety of serial or parallel TTL level data communications devices may be connected to the preferred embodiment through port 90. In particular, the inventors of the present invention have designed systems for implementing the card reading functions described hereinabove which connect a conventional RS-232 serial port from a digital computer to the preferred embodiment in order to extract data from administrative EEPROM cards as described hereinabove. Thus, in the academic system environmemt described hereinabove, an available device implementing the preferred embodiment may simply be used as a card reader and appropriate software is used on a general purpose digital computer connected to one of the serial ports in order to read the data from the software into the computer's memory for appropriate analysis and processing. It should be noted that in the environment described above, one expects there to be a relatively large number of machines which implement the preferred embodiment of the present invention available which may be used as card reading stations. Also, one may be temporarily removed from its location at an interactive video disc system for use as acard reader and then promptly returned.

Therefore, the implementation of 5 ports through a single DB25 connector allow the preferred emobdiment to achieve its object of remaining small and compact and having great versatility as a data communications device as well as a dedicated controller for various types of laser video disc players.

It should also be understood that embodiments of the present invention have been built where read only memory is used to embody memory 98 as shown in FIG. 2C and that this memory provides the microcomputer courseware for particular application.

From the foregoing description of the circuitry of the preferred embodiment, it will be appreciated that the apparatus is extremely flexible and provides, solely under the control of the operating system stored in memory 95 and appropriate courseware in either of memories 96 or 98, as wide variety of options for downloading courseware and storing information on user responses.

Figure 3:
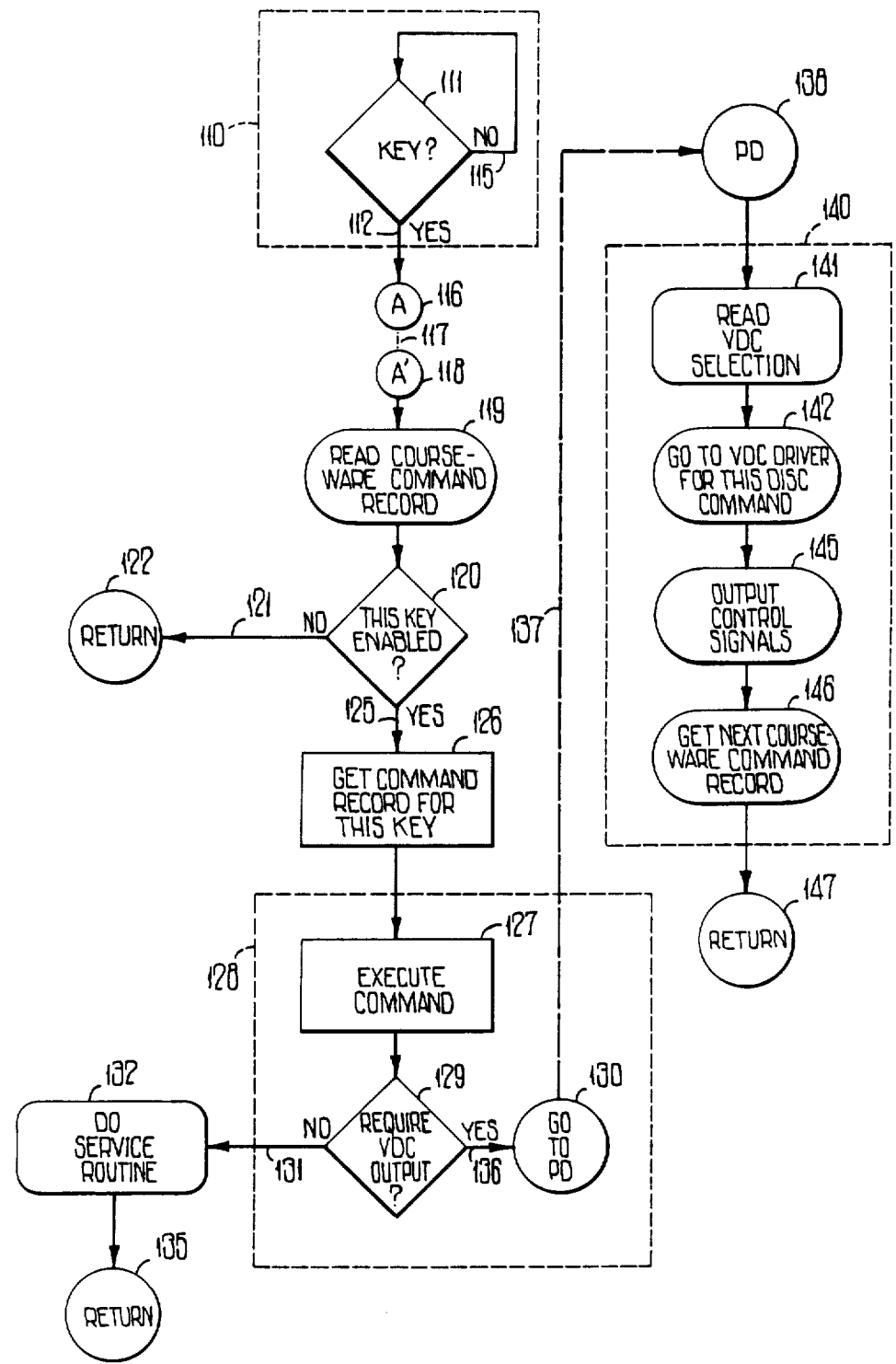
FIG. 3 is a logical flow diagram of the microcomputer firmware which controls the preferred embodiment.

FIG. 3 shows a high level flow diagram of the firmware controlling the preferred embodiment. It begins with block 110 at the top of FIG. 3. Block 110 simply represents a loop in which a test for a keyboard input is implemented at step 111. If a valid keyboard signal is present YES branch 112 is taken. If no valid keyboard input is present, no branch 115 is taken looping back to the test. It will be understood by those skilled in the art that execution of the loop surrounded by dashed line 110 represents implementation of writing to keypad write buffer 49 and reading from keypad read buffer 47, as described hereinabove in connection with FIG. 2B.

There is one other significant aspect of loop 110 which should be understood. Essentially, the preferred embodiment of the present invention is an interrupt driven machine. The exception to this statement is the loop represented by 110 in which scans of keyboard 15 are made. However, other routines of the preferred embodiment are handled as interrupt service routines. These will most often occur as an exit to an interrupt service routine from loop 110, although the exact sequence will be determined by the interrupt priority established in firmware.

For example, when serial communications controller 45 (FIG. 2D) needs to provide data to microcmoputer 30, it generates an interrupt request on line 70 as described hereinabove. When this occurs, microcomputer 30 will execute a conventional interrupt service routine (not shown in FIG. 3 ) for accepting a parallel serial byte from a USART. Similarly, if a interrupt request is generated on line 91, the appropriate service routine for analyzing an acknowledge signal from a video disc player is executed.

Also, it will be appreciated by those skilled in the art that FIG. 3 represents the flow control for the preferred embodiment at a high level. Those skilled in the art will know the details of implementations of such a routine with a microcomputer, and there are many persons of average skill in the art who can prepare Z8 assembly language instructions for final implementation of the routines described.

In passing, it should be noted that conventional keyboard checking routines are used in the preferred embodiment and are considered a part of test step 110, For example, the preferred embodiment rejects keypad conditions in which more than one key is depressed. Similarly, software debouncing is performed before microcomputer 30 determines that a valid key press has been detected and sends the flow control to YES branch 112. YES branch 112 goes to an exit point 116 labeled "A ". This is shown as connected by dashed line 117 to entry point 118 labeled "A ". The significance of this connection is to indicate that the keyboard service routine is conducted in essentially the same fashion as an interrupt service request. Thus, interrupt services would be represented by a plurality of different exits from loop 110.

The first step of the keyboard service routine is the "read courseware command record" routine shown at 119. This is a routine wherein a courseware command record is read from a courseware command record register. In its actual implementation, the preferred embodiment reasds, a pointer stored in a particular register of microcomputer 30. This pointer points to the current courseware command record within the microcomputer courseware storde in course RAM 96 (FIG. 2C). At this point, the storage of courseware command records should be briefly described. The coursewarse command records which embody the microcomputer courseware described hereinabove, are variable length records stored in the course. RAM. Each recod contains a fixed length hearder indicative of the particular ones of keypad 15 (FIGS. 1 and 2B) which are enabled in the current machine state. It also contains other appropriate command of information. Most notably, for each enabled key represented by a coureware command record, there is a pointer to the next courseware command record containing commands for the appropriate response to that particular key. Thus, it will be appreciated that coureware command records for which there are a large number of enabled keys will be lengthy as compared to a courseware command record which, for example, enables only one or two keys. Therefore, the invention have found that the overhead required by having a fixed length record header for each of the courseware command records is more than justified by the space saved from the use of variable length records to stored them.

Once the command record is read at 119, a test is executed at 120 to determine if the particular key which was operated is enabled for this couresware command record. If it is not no branch 121 is taken and the machine does a subroutine return shown at 122. This taken program flow control back into loop 110 awaiting the next keyboard response.

If the key is enabley by the coureware command record Yes branch 125 is taken. The leads to step 126 labeled "get command record of this key". As described hereinabove, this step is one which responds to the command record pointer associated with a particular enabled key. The pointer for this command record is loaded into the command pointer register and the machine then goes to step 127 labeled "execute command". It will be appreciated by those skilled in the art that this step simiply means fetching the instruction from the address in the courseware RAM indicated by the command record read at step 126.

STEP 127 is contained within a block surrounded by dashed line 128. It should be understood by those skilled in the art that block 128 actually represents fetching and execution of the instruction pointed to by the address in the command pointer register. However, it is broken out into steps 127, 129 and 130 to explain the functional response of the machine rather than the actual software implementation of fetching and executing the command to which the register points.

At step 129, a test is represented. This test is to determine whether the command to be executed requires video disc control output. It it does not, No branch 131 is taken to execute whatever non-VDC output routine is required by the particular command. This is represented as "do service routine" block 132. When routine 132 is completed, a subroutine return is made at 135.

Those skilled in the art will understand that conceptually routine 132 represents all the other possible non-VDC control routines executed by the preferred embodiment. Thus, for example, if the machine is in a state where it is seeking a user provided input for selecting a particular where disc player, and the key input provided indicates selection of a particular type of player corresponding to a name displayed under LCD window 12 (FIG. 1), service routine 132 would represent the routine which writes the VDC selection signal to its dedicated address in memory. Oher routines for displaying messages and general overhead of the preferred embodiment will also be executed for commands which do not require video disc control output.

Another service routine represented by 132 is the rountine of testing for card type and user identification signals describe hereinabove. When these routines are executed, particular addresses on the EEPROM card 98 are read to determine the type of card and a code representative of the card holders authorization level for access to information from the preferred embodiment. As described hereinabove, reading of information from or writing information to various locations of memory 98 will then take place in response to subsequent keyboard inputs.

Assume for the moment that Yes branch 136 is taken from step 129. The machine goes to a jump represented at 130 and labeled "go to PD". The "PD" here represent the player driver routines of the preferred embodiment. At this point it should be understood that the command record for this particular key contains information which generically defines a video disc control command signal, as described hereinabove. For example, the video disc command signal may be one which indicates that the disc player should step to fame 150 and display that frame. The video disc control command signal at this point is independent of the particular player in use at the time.

Dashed line 137 represents the branch to player driver entry point 138 and should thus be understood to represent a subroutine call executed at 130 with entry of the subroutine at 138. The player driver routine is represented by the steps surrounded by dashed line 140 in FIG. 3. The first step of the player driver routine is to read the VDC selection signal which is labeled "go to VDC driver for this video disc command", shown at 142. It should be understood that microcomputer 30 makes a logical combination of the stored VDC selection signal and the logical representation of the video disc command to point to a particular service routine in the portion of battery RAM 95 (FIG. 2C) containing the VDC characterization signals. The VDC characterization signals are nothing more than player specific commands to microcomputer 30 to provide particular electrical outputs. They are listed in a listed in a table containing a set of sequential instructions for microcomputer 30 to provide certain electrical outputs through connector 90 described hereinabove. Thus it will be appreciated that a logical combination of the VDC selection signal (representing the type of player being used) and the video disc command signal (representing the generic command of what the player is to do) is made to point to a particular address in the VDC characterization signal table in battery RAM 95. From this point, the machine simply steps to "output control signals" step 145. Physically, microcomputer 30 beings fetching instructions from the VDC characterization table which represent the electrical output signals to be provided to a particular video disc player to cause it be execute the generic video disc command.

When this is finished, step 146 is executed. At step 146, once all of the appropriate control output signals are written, the machine refers to currently execued courseware command record which was selected at step 126 in response to operation of a particular key. This record contains a pointer to the next courseware command record which is then loaded into the courseware command record register. When this is completed, a return is executed at 147 taking the machine back to loop 110.

Referring once again to the algorthmic state machine. model described hereinabove, it will be appreciated that the current courseware command record read at step 119 is represents the present state of the machine at the time step 119 is executed. The particular keystroke which provided the user response input which took the flow control to step 119 represents the input to the machine. Based on its present state and the inputs, the next course command record seleced at 146, which is actually derived from the record read at 126, then represents the new state of the machine. It should be noted than in embodiments of the present invention in which display of a particular frame can represet more than one state, as described hereihabove, the same analysis holds true. However, there will not necessarily be a one to one correspondences between the frame presently being displayed and the pointers in the courseware records to the next possible courseware records.

Figure 4:
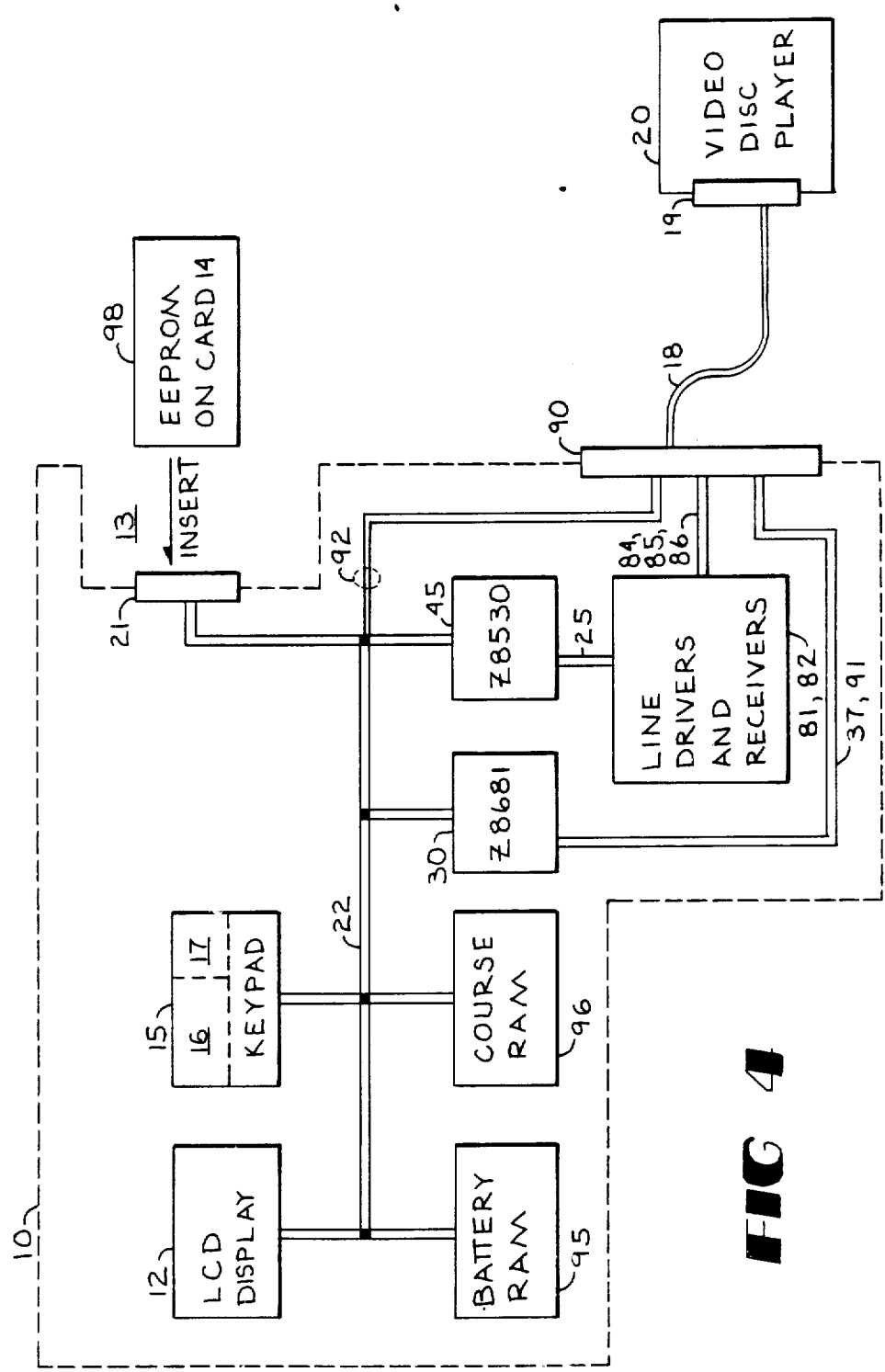
FIG. 4 is a block diagram of the preferred embodiment of the present invention in its preferred environment.

FIG. 4 is a block diagram of the preferred embodiment of the present invention in its preferred environment. Controller 10 comprises an LCD dispaly 12, a keypad 15, a battery RAM 95, a course RAM 96, a Z8681 microprocessor, 30, a Z8530 USART 45, line drivers and receivers 81 and 82, a connector 21 at the end of slot 13, and DB≈connector 90. As previously indicated, keypad 15 has a conventional 4×3 keypad 16 and a 5 key array 17. Also, as previously indicated RAM 95 may be considered to be partitioned into several segments, each of which performs a specific function, such as: storage of VDC characterization signals; storage of the VDC selection signal; storage of a plurality of sets of VDC characterization signals; provision of control signals to the microcomputer; and storage of result data as a response to user response signals. Components 12, 15, 21, 30, 45, 95 and 96 may be considered to be connected by composite bus 22 which carries address, data, and control signals. For convenience and simplicity, cpmposite bus which perform address decoding, latching, and buffering are not shown in the figure but are shown in FIG. 2. The EEPROM 98, shown as being located on card 14, can be read by microcomputer 30 once card 14 is inserted into slot 13 so that EEEPROM 98 is electrically connected to composite bus 22 via connector 21. As previously indicated, EEPROM 98 may be considered as being partitioned into several address spaces which perform one or more of the following fucnction: storage of a card type identification signal for the EEPROM memory; storage of user identification codes; storage of microcomputer courseware; and storage of the result data. DB25 connector 90 is connected to composite bus 22 by bus 92, to the line drivers/receivers 81 and 82 by conductors 84 through 86, and to microcomputer 30 by bus 37 and conductor 91. Connector 90 provides a connection means which includes a plurality of electrical signal paths for connecting the controlled 10 to a control port 19 on at least one of the video disc players 20. Transfer of electrical signals between connector 19 and 90 is accomplished by multiconductor cable 18.

The foregoing has been a complete description of the preferred embodiment of the present invention. From this description, other refinements to and embodiments of the present invention will suggest themselves to those skilled in the art. Therefore, the scope of the present invention is to be limited only by the claims below.

What is claimed is:

1. A dedicated controller for controlling interactive video disc systems comprising in combination:
    a housing;
    a selectively operable input means disposed on said housing for providing user response signals;
    connection means, including a plurality of electrical signal paths, for connecting said controller to a control port on at least one of said video disc systems;
    at least one microprocessor,
    means for providing a video disc control selection signal, corresponding to a particular one of a predetermined plurality of said video disc systems, in response to one of said user response signals;
    first storage means for storing said video disc control selection signal;
    second storage means for storing a plurality of sets video disc control characterization signals:
    third storage means for providing control program signals to said microprocessor;
    means for connecting said microprocessor to said first, second, and third storage means; and
    wherein said microprocessor is responsive to each of said user response signals to access one of said video disc control characterization signals from a particular one of said sets of video disc control characterization signals determined by said video disc control selection signal and to provide a predetermined signal state to said plurality of electrical signal paths of said connection means in response thereto.

2. A dedicated controller for controlling interactive video disc systems as recited in claim 1 wherein said connection means is a first connection means and further comprising: second connection means including a plug connector accessible from the exterior of said dedicated controller: and wherein
    said third storage means comprises a discrete cartridge containing at least a portion of said read only memory, a cartridge being selectively and alternately connectable to and removable from said plug connector.

3. A dedicated controller for controlling interactive video disc systems as recited in claim 2 further comprising:
    fourth storage means contained within said housing for storing result data in response to said user response signals; and
    fifth storage means contained within said discrete cartridge and including read/write memory means for selectively storing said result data in reponse to said cartridge being connected to said second connection means and at least one predetermined one of said user response signals.

4. A dedicated controller for controlling interactive video disc systems as recited in claim 3 wherein:
    said result data comprises a plurality of discrete sets of result data;
    said fifth storage means includes means for storing user identification signals; and
    said microprocessor is responsive to said user identificating signals, and control program singnals, and at least one predetermined one of said user response signals to write a particular one of said discrete sets of result data to said read/write memory means of said fifth storage means.

5. dedicated controller for controlling interactive video disc systems as recited in claim 3 wherein
    said result data comprises a plurality of discrete sets of result data;
    said fifth storage means includes means for storing user identification signals; and
    said microprocessor is responsive to at least one predetermined particular one of said user identificating signals and said control program signals to write a plurality of said discrete sets of result data to said read/write memory means of said fifth storage means.

* * * * *